United States Patent
Challener et al.

(10) Patent No.: US 8,702,812 B2
(45) Date of Patent: Apr. 22, 2014

(54) REMOTE DISABLEMENT OF A COMPUTER SYSTEM

(75) Inventors: David C. Challener, Raleigh, NC (US); Howard Locker, Cary, NC (US); Randall S. Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1352 days.

(21) Appl. No.: 12/040,821

(22) Filed: Feb. 29, 2008

(65) Prior Publication Data

US 2009/0222889 A1   Sep. 3, 2009

(51) Int. Cl.
   *G06F 21/00*  (2013.01)
(52) U.S. Cl.
   USPC .................. 726/35; 726/34; 713/194
(58) Field of Classification Search
   USPC ........................................... 726/35
   See application file for complete search history.

(56) References Cited

U.S. PATENT DOCUMENTS

| | | | |
|---|---|---|---|
| 6,334,150 B1 * | 12/2001 | Cromer et al. | 709/223 |
| 2001/0013098 A1 * | 8/2001 | Angelo et al. | 713/200 |
| 2002/0186845 A1 * | 12/2002 | Dutta et al. | 380/247 |
| 2006/0161790 A1 * | 7/2006 | Hunter et al. | 713/189 |
| 2006/0173991 A1 * | 8/2006 | Piikivi | 709/224 |
| 2006/0272034 A1 * | 11/2006 | Bhansali et al. | 726/34 |
| 2006/0294402 A1 * | 12/2006 | Poisner | 713/300 |
| 2007/0003064 A1 * | 1/2007 | Wiseman et al. | 380/281 |

* cited by examiner

*Primary Examiner* — Yogesh Paliwal
(74) *Attorney, Agent, or Firm* — Ference & Associates LLC

(57) ABSTRACT

Methods and arrangements for ensuring that, when a computer system is stolen or otherwise misplaced, the system is rendered unusable (i.e., locked down). Conventional solutions have required software running on the system to perform the lockdown action, but in accordance with at least one preferred embodiment of the present invention is the linkage of TPM (Trusted Platform Module) and AMT (Active Management Technology) solutions whereby an AMT arrangement can remove secure data or identifiers so that any encrypted data present on the system will become unusable.

20 Claims, 3 Drawing Sheets

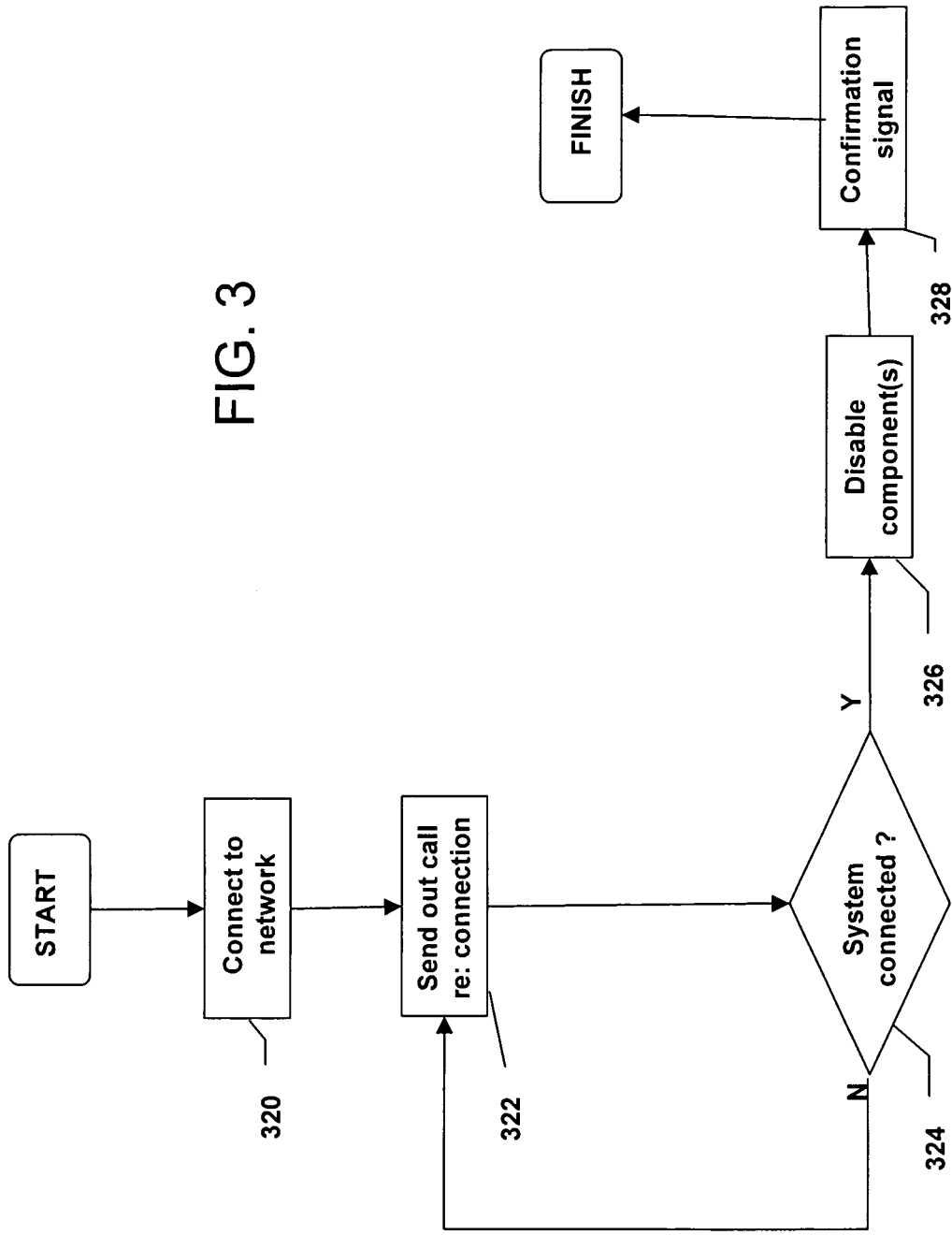

REMOTE DISABLEMENT OF A COMPUTER SYSTEM

FIELD OF THE INVENTION

The present invention relates generally to computer systems and to methods and arrangements for disabling critical components of the same.

BACKGROUND OF THE INVENTION

When a computer system is stolen or otherwise misplaced, it desirable to render the system unusable (i.e., lock it down). This applies most readily to such as a laptop computer systems (alternatively, notebook or tablet computer systems), but also can apply to desktop computer systems Conventional solutions have required software running on the system to perform the lockdown action. A tremendous disadvantage is found here in that, should an unauthorized user be in a position to access this software after stealing the computer, the software can easily be disabled, removed and/or replaced, thus allowing the unauthorized user to easily restart and make use of the computer.

Accordingly, a highly compelling need has been recognized in connection with providing methods and arrangements for locking down a computer system that are not reliant upon software running on the system itself.

SUMMARY OF THE INVENTION

Broadly contemplated herein, in accordance with at least one presently preferred embodiment of the present invention, is the linkage of TPM (Trusted Platform Module) and AMT (such as iAMT [Intel Active Management Technology]) solutions whereby an AMT arrangement can remove secure data or identifiers so that any encrypted data present on the system will become unusable.

In summary, one aspect of the invention provides a method comprising: detecting a computer system connection to a network; thereafter remotely disabling a computer system component taken from the group consisting essentially of: an encryption component, and a security-based component; the disabling being performed when the computer system is not fully booted.

Another aspect of the invention provides a system comprising: a main memory; a network interface which connects with a network; and an arrangement for effecting disablement of a system component responsive to a network command; the arrangement for effecting disablement acting to disable a computer system component taken from the group consisting essentially of: an encryption component, and a security-based component; the arrangement for effecting disablement acting to disable the system component when the system is not fully booted.

Furthermore, an additional aspect of the invention provides a program storage device readable by machine, tangibly embodying a program of instructions executable by the machine to perform a method comprising: detecting a computer system connection to a network; thereafter remotely disabling a computer system component taken from the group consisting essentially of: an encryption component, and a security-based component; the disabling being performed when the computer system is not fully booted.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 3 schematically illustrates a process flow for disabling critical computer system components.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
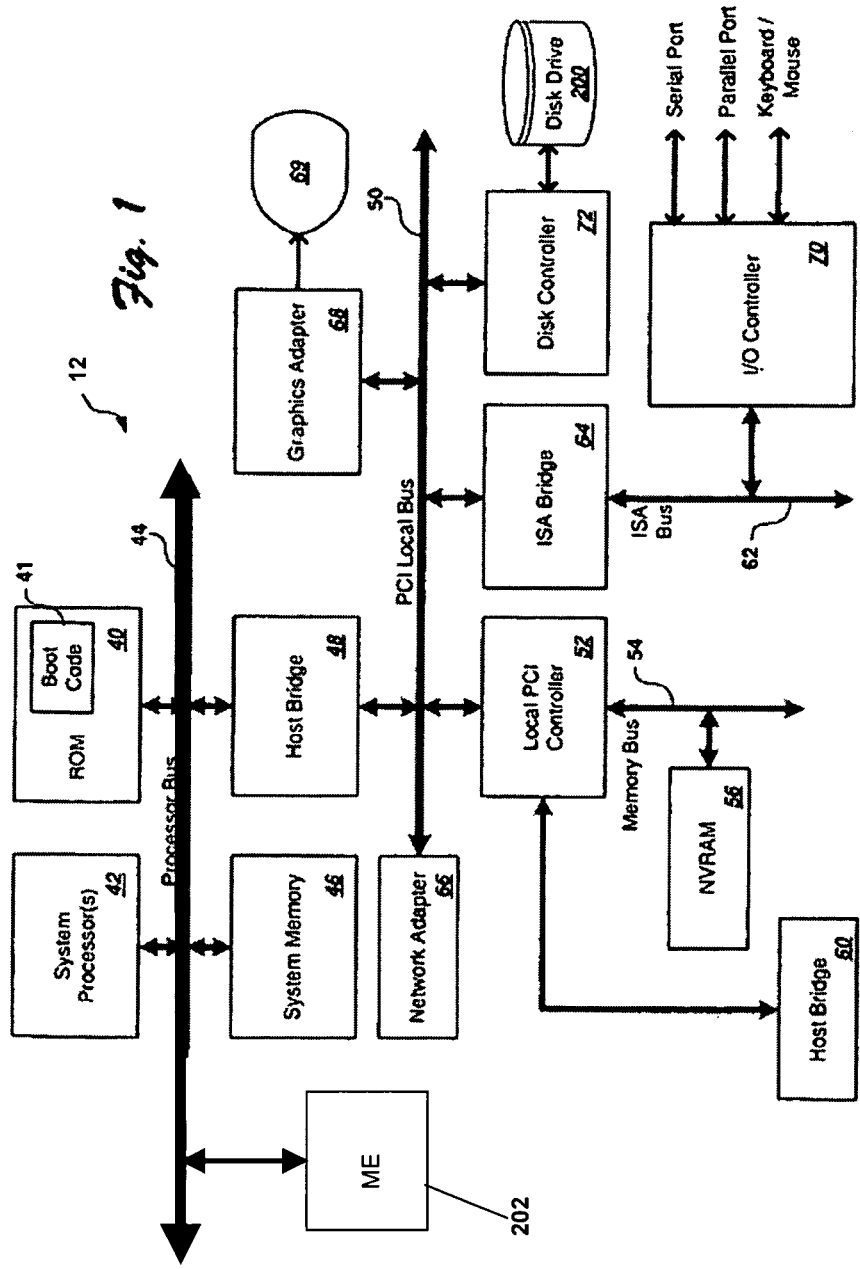
FIG. 1 schematically illustrates a computer system with added components.
Figure 2:
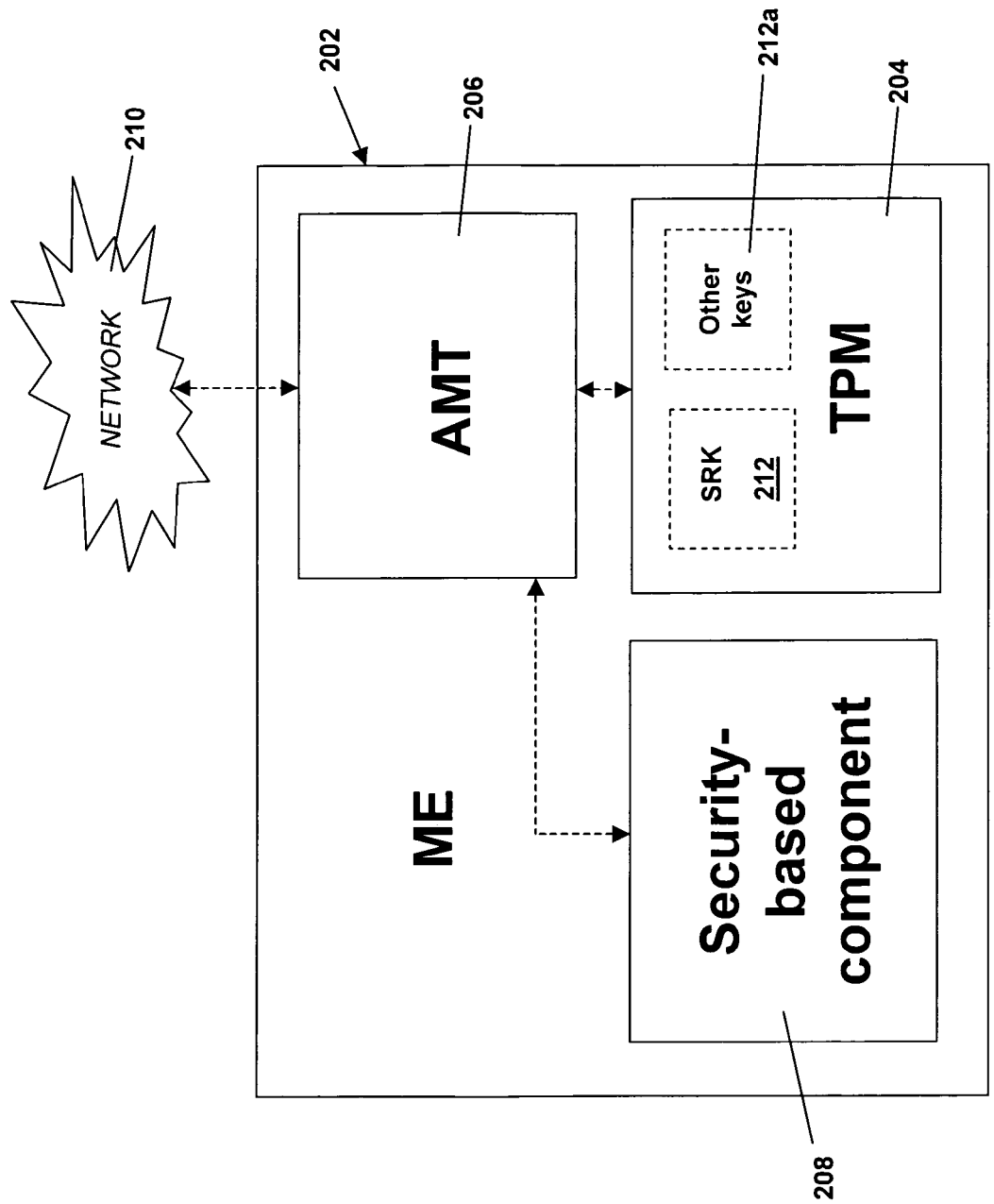
FIG. 2 schematically illustrates a ME and components.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

Indicated at 202 is a ME (management engine) which may be employed in accordance with at least one presently preferred embodiment of the present invention. ME's, as currently evolving (examples of which are being manufactured by Intel), are inclusive of several useful components that previously were operationally segregated. By integrating such components operationally, they can be more readily and flexibly managed to address contingent problems such as shutting down at least portions of a computer when the computer is in the hands of an unauthorized user. With regard to the system 12 shown in FIG. 1, the ME may be located on the ISA bus 62 as shown. It should be understood that the system 12 of FIG. 1 provides but one illustrative and non-restrictive example among a very wide variety of systems that can employ an ME in accordance with embodiments of the present invention.

As shown schematically in FIG. 2, ME 202 may preferably include a Trusted Platform Module (TPM) 204, Active Management Technology (AMT) 206 (which preferably is embodied by Intel AMT, or iAMT) and one or more security-based components 208 such as (but of course not limited to) fingerprint matching software. It will be noted, for the purposes of ongoing discussion herein, that those AMT's (and related software) and TPM's as manufactured by Intel are often referred to as "iAMT" and "iTPM" Background information regarding AMT may be found at www.intel.com/software.amt2, while background information regarding TPM's may be found at the Trusted Computing Group website, www.trustedcomputinggroup.org. Background information on fingerprint readers and software may be found at http://www.pc.ibm.com/us/security/fingerintreader.html.

It should be appreciated an AMT enabled computer, such as iAMT enabled computer, will contain a Management Engine (ME) which comprises a service processor, dedicated firmware for the service processor, and logic in an Ethernet and/or 802.11 and/or WAN controller to allow the ME to talk to other locations across the internet even when the system is off, as these parts will always have power (i.e., very little power is required). Accordingly, one may send items to the ME 202, and it can process and return items irrespective of whether the main operating system (OS) is running or not running. Thus, ME 202 enables contact with a network even when the system is technically off. Preferably, ME 202 is configured to disable one or more critical components of system 12 responsive to commands received from a network 210 (e.g., from a "mother" computer or system connected into network 210). The network interface can be realized directly or indirectly via essentially any suitable arrangement, e.g., a network adapter such as that indicated at 66 in FIG. 1.

As such, and as alluded to hereinabove, ME 202 will preferably be in a position to activate or deactivate any of several security arrangements which themselves have hitherto been functionally segregated. Accordingly, ME 202 preferably is configured to disable either or both of the following: an authorization key 212 associated with TPM 204 and the functionality of security-based component 208 (e.g., fingerprint matching software, which interacts with a fingerprint reader to enable some level of access to system 12, e.g., via release of a hard-disk password responsive to a positive fingerprint match). Other types of security-based components could include, but certainly are not limited to, iris readers and power-on passwords. As such, ME 202 facilitates the communication with a network that would enable commands to be received to disable either or both of TPM 204 and security-based component 208 as just described, and also applies such commands within the ME 202 to carry out the disabling action itself.

Preferably, the authorization key 212 associated with TPM 204 is a Storage Root Key (SRK), itself well-known and described in detail at the above-referenced Trusted Computing Group website. As is known, an SRK is a critical encryption key that controls and enables all other encryption keys associated with a TPM; accordingly, by shutting down any functionality of SRK 212, it will not be possible for an unauthorized user to decrypt any other keys (herein, indicated at 212a) of TPM 204. (Essentially, the SRK 212 serves as a "private" portion of a "public/private" key pair, wherein the "public" portion is a function-specific key also contained within the TPM 204. The non-SRK keys 212a of the TPM 204 will thus be rendered completely useless [preferably through action of iAMT 206] if not able to be paired with the SRK 212 by whatever means that an unauthorized user might attempt.)

Likewise, security-based component 208 can be suitably disabled by AMT 206ME 202 in response to a command received by AMT 206 over network 210. As such, for example, AMT 206 can shut down any fingerprint matching or authorization software to avert the possibility that an authorized user's genuine fingerprint(s) were unknowingly expropriated to help an unauthorized user gain access to system 12.

It will be appreciated from the foregoing that, in accordance with at least one presently preferred embodiment of the present invention, there is broadly contemplated the selective remote disabling of a computer system when the computer system is connected to a network. (The network connection, for its part, could conceivably be hard-wired or wireless.)

This disabling takes place without the need to boot the system (i.e., without the system's full processing power).

FIG. 3 schematically illustrates a process for undertaking the actions described hereinabove. The process starts when, after theft or inadvertent removal or misplacement, a system is connected to a network (320). At a "mother" computer or system, a singular call or periodic calls (322) are sent out (via known arrangements) to ascertain that the system is indeed connected. If (324) indeed a connection (or interface) of the sought system is detected, then a command is sent to the system to disable one or more critical components as discussed heretofore (326). Finally, the system will preferably send a return signal (328) to confirm that the disablement is complete.

By way of further elaboration and clarification, it is conceivable to disable one critical component, more than one critical component, or all available critical components via methods and arrangements as broadly contemplated herein. Thus, drawing on the example of FIG. 2, a SRK 212 could be disabled, a security-based component 208 (such as fingerprint matching software) could be disabled, or both could be disabled (possibly in addition to one or more other critical components that might be disabled).

By way of further background information, software which enables a computer system to make itself known to a network once connected to a network is well known; for example, Absolute Software manufactures "COMPUTRACE" software for this purpose. "COMPUTRACE" also requires a BIOS to boot, however, whereas solutions in accordance with at least one embodiment of the present invention do not require BIOS and can work with the system being off as long as the iAMT system is running. This is software that is difficult to remove from a system but, once the system is connected into a network, nonetheless enables contact with a "mother" computer or system on the network without the need for system booting.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
 detecting a computer system connection to a network;
 thereafter disabling a computer system component in response to a remotely provided command ascertained by a management engine of said computer system, said computer system component comprising: an encryption component comprising an encryption key stored in a trusted platform module, and a security-based component which operates in connection with a computer system security component separate from said management engine;
 said management engine being configured to provide said disabling irrespective of a boot state of the computer system.

2. The method according to claim 1, wherein said encryption component comprises an authorization key; and wherein said disabling prevents utilization of said authorization key to decrypt data stored on said computer system in an encrypted form.

3. The method according to claim 2, wherein said encryption component comprises a storage root key.

4. The method according to claim 3, wherein said storage root key is in the trusted platform module.

5. The method according to claim 4, wherein said disabling comprises disabling said storage root key and another encryption key.

6. The method according to claim 1, further comprising the step of confirming said disabling with a confirmation signal irrespective of the computer system boot state.

7. The method according to claim 1, wherein said disabling comprises employing active management technology to disable said computer system component.

8. The method according to claim 7, wherein said disabling further comprises sending a disable command to the active management technology.

9. The method according to claim 1,
 wherein said disabling prevents:
 utilization of said encryption component to decrypt data stored on said computer system in an encrypted form; and
 utilization of said security-based component for user authentication.

10. A system comprising:
 a main memory;
 a network interface which connects with a network; and
 circuitry for effecting disablement of a system component responsive to a network command ascertained by said circuitry;
 said circuitry for effecting disablement being configured to disable a computer system component comprising: an encryption component comprising an encryption key stored in a trusted platform module, and a security-based component which operates in connection with a system security component separate from said circuitry;
 said circuitry for effecting disablement being configured to disable said system component irrespective of a boot state of said system.

11. The system according to claim 10, wherein said encryption component comprises an authorization key; wherein said disabling prevents utilization of said authorization key to decrypt data stored on said computer system in an encrypted form.

12. The system according to claim 10, further comprising:
 a fingerprint reader;
 wherein said security-based component comprises fingerprint matching software.

13. The system according to claim 11, wherein
 said trusted platform module comprises said authorization key.

14. The system according to claim 13, wherein said circuitry for effecting disablement is configured to disable said authorization key and another encryption key.

15. The system according to claim 10, wherein said circuitry is configured to confirm disablement of a system component via sending a confirmation signal to the network irrespective of the system boot state.

16. The system according to claim 10, wherein said circuitry for effecting disablement comprises active management technology.

17. The system according to claim 16, wherein said active management technology acts to receive a disable command from the network.

18. The system according to claim 10, wherein circuitry for effecting disablement acts to prevent:
   utilization of said encryption component to decrypt data stored on said system in an encrypted form; and
   utilization of said security-based component for user authentication.

19. The system according to claim 10, wherein:
   said trusted platform module comprises an authorization key;
   said circuitry for effecting disablement comprises active management technology;
   said system comprises a management engine; and
   said management engine comprises said active management technology, said trusted platform module and said security-based component.

20. A program storage device readable by machine, tangibly embodying a program of instructions executable by the machine to perform:
   detecting a computer system connection to a network;
   thereafter disabling a computer system component in response to a remotely provided command ascertained by a management engine of said computer system, said computer system component comprising: an encryption component comprising an encryption key stored in a trusted platform module, and a security-based component which operates in connection with a computer system security component separate from said management engine;
   said management engine being configured to provide said disabling irrespective of a boot state of the computer system.

* * * * *